United States Patent [19]
Cromer et al.

[11] Patent Number: 5,860,001
[45] Date of Patent: Jan. 12, 1999

[54] COMPUTER SYSTEM HAVING AT LEAST TWO BOOT SEQUENCES

[75] Inventors: Daryl C. Cromer, Cary; Ellen M. Gibel; Robert D. Johnson, both of Raleigh; David Rhoades, Apex; Randall S. Springfield, Chapel Hill, all of N.C.

[73] Assignee: International Business Machines Corporation, Armonk, N.Y.

[21] Appl. No.: 858,873

[22] Filed: May 19, 1997

[51] Int. Cl.$^6$ .................................................. G06F 9/445
[52] U.S. Cl. ............................................ 395/651; 395/652
[58] Field of Search .................................... 395/651, 652, 395/653, 712, 750.02

[56] References Cited

U.S. PATENT DOCUMENTS

| | | | |
|---|---|---|---|
| 4,663,707 | 5/1987 | Dawson | 364/200 |
| 5,257,378 | 10/1993 | Sideserf et al. | 395/700 |
| 5,390,170 | 2/1995 | Sawant et al. | 370/58.1 |
| 5,404,544 | 4/1995 | Crayford | 395/750 |
| 5,410,713 | 4/1995 | White et al. | 395/750 |
| 5,450,576 | 9/1995 | Kennedy | 395/650 |
| 5,452,454 | 9/1995 | Basu | 395/700 |
| 5,487,066 | 1/1996 | McNamara et al. | 370/85.2 |
| 5,491,788 | 2/1996 | Cepulis et al. | 395/182.11 |
| 5,596,628 | 1/1997 | Klein | 379/93 |
| 5,694,600 | 12/1997 | Khenson et al. | 395/652 |

*Primary Examiner*—Dennis M. Butler
*Attorney, Agent, or Firm*—Anthony N. Magistrale

[57] ABSTRACT

Disclosed is a computer system which can be powered on by at least a first and a second method wherein the first method is different from the second method. The computer system is operative to allow a user to select which one of at least two different pre-selected ordered lists of initial program load (IPL) devices are to be used depending on whether the system was powered on by the first method or the second method. The system includes a processor coupled to a local bus and an input/output (IO) bus. A non-volatile memory is coupled to the processor and the IO bus. The non-volatile memory has a basic input output system (BIOS) stored therein and the BIOS is effective for responding to the energization of the computer system by initiating a power on self test (POST). The non-volatile memory also stores a first pre-selected ordered list of IPL devices and a second pre-selected ordered list of IPL devices. The POST is operative to determine whether the system was powered on by the first power on method or the second power on method. If the first power on method was used, POST will attempt to boot from the first pre-selected ordered list of IPL devices and if the second power on method was used, POST will attempt to boot from the second pre-selected ordered list of IPL devices.

12 Claims, 8 Drawing Sheets

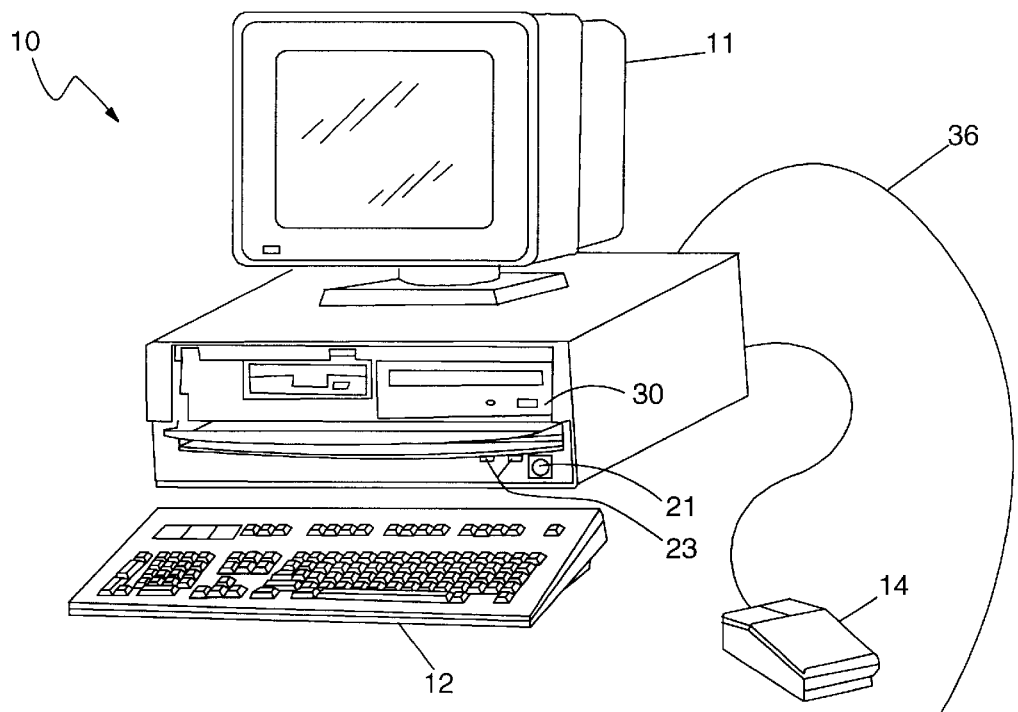
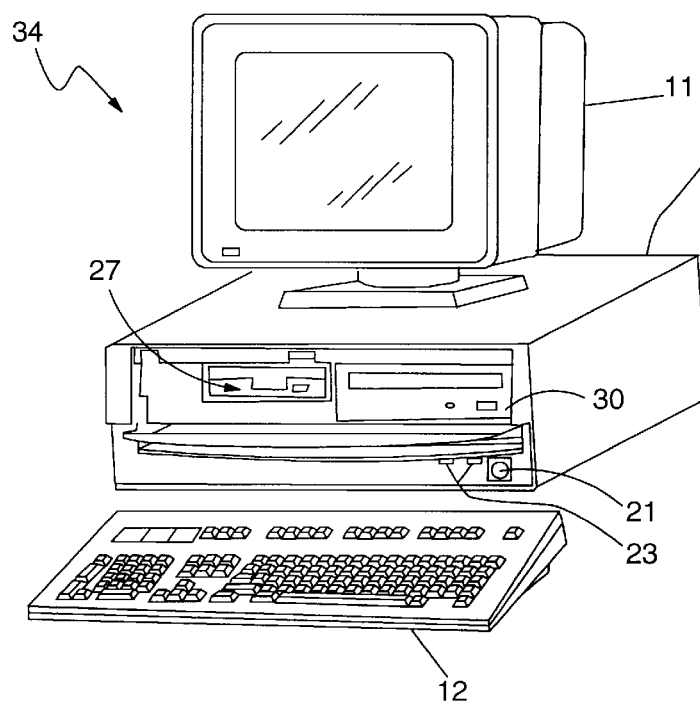
FIG. 1

Startup Sequence

First Startup Device     [Diskette Drive 0, Hard Disk 0, Network, Disabled]
Second Startup Device    [Diskette Drive 0, Hard Disk 0, Network, Disabled]
Third Startup Device     [Diskette Drive 0, Hard Disk 0, Network, Disabled]
Fourth Startup Device    [Diskette Drive 0, Hard Disk 0, Network, Disabled]

Automatic Power On Startup Sequence  [Enabled, Disabled]
First Startup Device     [Diskette Drive 0, Hard Disk 0, Network, Disabled]
Second Startup Device    [Diskette Drive 0, Hard Disk 0, Network, Disabled]
Third Startup Device     [Diskette Drive 0, Hard Disk 0, Network, Disabled]
Fourth Startup Device    [Diskette Drive 0, Hard Disk 0, Network, Disabled]

FIG. 6

Advanced Power Management

APM BIOS Model  [Enabled, Disabled]
Automatic Hardware Power Management
Activity Monitor
Automatic Power On

FIG. 7

|  | Automatic Power On |
|---|---|
| Serial Port Ring Detect | [Enabled, Disabled] |
|    Startup Sequence | [Primary, Automatic] |
|  |  |
| Modem Ring Detect | [Enabled, Disabled] |
|    Startup Sequence | [Primary, Automatic] |
|  |  |
| Wake Up on Alarm | [Disabled, Single Event, Daily Event] |
|    Alarm Date MM/DD/YY | 02/10/97 |
|    Alarm Time | 08:50 |
|    Startup Sequence | [Primary, Automatic |
|  |  |
| Wake on LAN |  |

FIG. 8

|  | Wake on LAN |
|---|---|
| Wake on LAN | [Enabled, Disabled] |
|    Startup Sequence | [Primary, Automatic] |

FIG. 9

COMPUTER SYSTEM HAVING AT LEAST TWO BOOT SEQUENCES

RELATED APPLICATIONS

The present invention is believed to be related to the following issued patents and pending application:

U.S. Pat. No. 5,548,763, "DESKTOP COMPUTER SYSTEM HAVING MULTI-LEVEL POWER MANAGEMENT" (Attorney Docket No. BC9-93-015);

application Ser. No. 08/302,147, filed Sep. 7, 1994, and entitled "MULTIFUNCTION POWER SWITCH AND FEEDBACK LED FOR SUSPEND SYSTEMS" (Attorney Docket No. BC9-94-108) now U.S. Pat. No. 5,630,142;

U.S. Pat. No. 5,530,879, "COMPUTER SYSTEM HAVING POWER MANAGEMENT PROCESSOR FOR SWITCHING POWER SUPPLY FROM ONE STATE TO ANOTHER RESPONSIVE TO A CLOSURE OF A SWITCH, A DETECTED RING OR AN EXPIRATION OF A TIMER" (Attorney Docket No. BC9-94-109); and U.S. Pat. No. 5,396,636, "REMOTE POWER CONTROL VIA DATA LINK".

BACKGROUND OF THE INVENTION

1. Field of the Invention

The present invention relates to computer systems and more particularly to a computer system having at least two different boot sequences that can be selected by a user depending on how the computer system is powered on.

2. Description of Related Art

Personal computer systems are well known in the art. Personal computer systems have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including random access memory (RAM) and basic input output system read only memory (BIOS ROM), a system monitor, a keyboard, one or more flexible diskette drives, a CD-ROM drive, a fixed disk storage drive (also known as a "hard drive"), a so-called "mouse" pointing device, and an optional printer. One of the distinguishing characteristics of these systems is the use of a motherboard or system planar to electrically connect these components together. Examples of such personal computer systems are IBM's PC 300 series and IBM's Aptiva Series.

One of the first operations to be performed when a computer is turned on is to load initial programs into the main or system memory to provide the basic tools and utilities which define the operations of the computer system. Such initial programs include the BIOS, the operating system and particular applications defined by initialization control information. The initialization control information which causes an initial program load (IPL) includes Power On Self Test (POST) code, IPL control logic (often termed the boot record) and control data. The POST code can be stored in BIOS in a flash memory.

When the computer system is powered on from its power switch, the POST code is executed and the IPL can occur from a floppy diskette drive, a CD-ROM drive or the hard drive. In addition, if the computer is provided with a suitable adapter such as, for example, an IBM Auto Wake Token-Ring ISA Adapter and is connected to a computer network such as, for example, a local area network (LAN), there can be another potential source for the IPL operation. Namely, the IPL can occur from a remote storage location in a LAN server computer system (often called a remote IPL or RIPL).

Using the computer's ROM setup utility, a user can select which storage devices to IPL from and in what order to try each storage device when the system is powered on by the power switch. For example, the user can enter the configuration/setup utility by depressing the "F1"0 key during POST, select Start Options and then select Startup Sequence. From the Startup Sequence the user can choose the first, second, third, etc. startup devices. The user selections would be stored in a non-volatile memory of the computer system. If the user chose the following sequence 1-diskette drive, 2-hard drive and 3-network, then when the power switch is pressed, the POST code will first interrogate the floppy disk drive to test whether the drive contains a bootable diskette (i.e., whether a diskette is present and whether a valid boot record is held thereon). If it does, then the boot record on the diskette is used to control the initialization of the system. If there is not a bootable diskette in the floppy disk drive, then POST next interrogates the hard disk drive to test whether it has a valid boot record. If the hard drive does, then its boot record is used to control system initialization. If there is not a valid boot record stored on the hard drive, then POST next transfers control to RIPL ROM logic in the network adapter. The RIPL ROM logic will then attempt to establish a connection with a remote network server and enable the remote IPL of the operating system in a conventional manner. If after all these tests no valid boot record is found in any of the IPL devices an error message is displayed.

Current computer systems, however, have the ability to be powered on by several methods other than the power switch. For example, systems today can be powered on when a telephone ring is detected by a modem connected to the computer's serial port. In addition, the system can be programmed to turn on at a specific alarm time (wake on alarm). If the system is connected to a network, it can be remotely powered on across the LAN (wake on LAN). Current computer systems use the same ordered list of IPL storage devices regardless of whether the system is powered on by the power switch or by one of the other methods just mentioned. However, this is a disadvantage for users that want to use a different sequence when the system is powered on by other than the power switch.

For example, when powering on using the power switch a user may want to try the diskette drive first, and if there is no diskette inserted, IPL from the hard drive. However, when powering on because of being turned on by receipt of a "wake up" packet from the LAN, a user might want to RIPL from the LAN instead of booting from the diskette or hard drive. Currently, to do this, the user would need to invoke the ROM setup utility and change the boot sequence to have RIPL from the LAN as the first choice. However, once this is done, the system will attempt RIPL for all power on methods including if the system is powered on by the power switch.

It is therefore desirable to provide a computer system that allows a user to set the order of at least two different lists of IPL devices and select which list is to be used depending on the manner in which the computer system is powered on.

SUMMARY OF THE INVENTION

The present invention is directed to a computer system which can be powered on by at least a first and a second method wherein the first method is different from the second method. The computer system is operative to allow a user to select which one of at least two different pre-selected ordered lists of initial program load (IPL) devices are to be used depending on whether the system was powered on by the first method or the second method. The system includes a processor coupled to a local bus and an input/output (IO) bus. A direct access storage device (DASD) is electrically coupled to the processor is capable of storing a plurality of data records.

The system further includes a non-volatile memory coupled to the processor and the IO bus. The non-volatile memory has a basic input output system (BIOS) stored therein and the BIOS is effective for responding to the energization of the computer system by initiating a power on self test (POST). The non-volatile memory also stores a first pre-selected ordered list of IPL devices and a second pre-selected ordered list of IPL devices. The POST is operative to determine whether the system was powered on by the first power on method or the second power on method. If the first power on method was used, POST will attempt to boot from the first pre-selected ordered list of IPL devices and if the second power on method was used, POST will attempt to boot from the second pre-selected ordered list of IPL devices.

One advantage of the present invention is that it allows for easier network management of computer systems. For example, the computer system can be set up to IPL from a diskette or fixed disk when a user starts the system via the power switch. The system can be further set up to RIPL to a remote computer when the system is turned on via a wake up packet over a LAN. This would allow a network administrator to update software when the user is not present.

BRIEF DESCRIPTION OF THE DRAWINGS

FIG. 1 is a perspective view of a personal computer embodying this invention and a LAN station remote computer system;

FIG. 4–9 are diagrams of various setup screens which are displayed on monitor 11 when a user accesses a setup/configuration utility program;

DETAILED DESCRIPTION OF THE INVENTION

Figure 2:
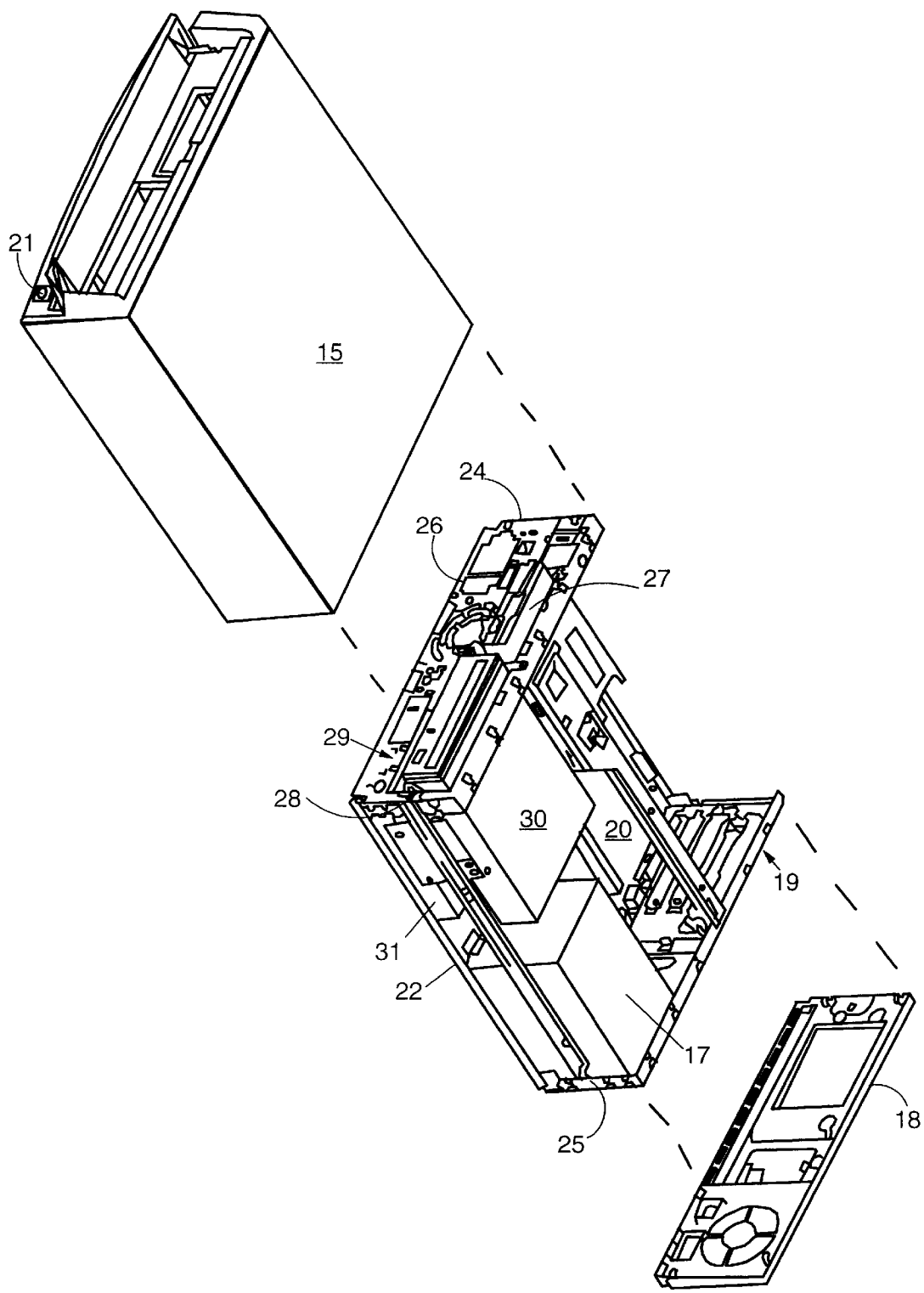
FIG. 2 is an exploded perspective view of certain elements of the personal computer of FIG. 1 including a chassis, a cover, an electromechanical direct access storage device and a planar board and illustrating certain relationships among those elements.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. This application is written for those very familiar with all aspects of computer system design.

Referring now more particularly to the accompanying drawings, a computer system embodying the present invention is there shown and generally indicated at 10 (FIG. 1). As mentioned hereinabove, the computer 10 may have an associated display monitor 11, keyboard 12, mouse 14, and printer or plotter (not shown). The computer 10 has a cover 15 which is a decorative outer member (FIG. 2) and a back plate shield member 18 which cooperate with a chassis 19 in defining an enclosed, shielded volume for receiving electrically powered data processing and storage components for processing and storing digital data. At least certain of these components are mounted on a multi layer planar 20 or motherboard which is mounted on the chassis 19 and provides a means for electrically interconnecting the components of the computer 10 including those identified above and such other associated elements as floppy disk drives, various forms of direct access storage devices, accessory adapter cards or boards, and the like. As pointed out more fully hereinafter, provisions are made in the planar 20 for the passage of input/output signals to and from the operating components of the microcomputer.

The system 10 has a power supply 17, a power button 21, also herein referred to as switch 21, and power/feedback LED 23. The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a lower bay 29 are provided. One of the upper bays 26 is adapted to receive peripheral drives of a first size (such as those known as 3.5 inch drives) while the other 28 is adapted to receive drives of a different size (such as a CD ROM drive) and the lower bay is adapted to receive another drive. One floppy disk drive is indicated at 27 in FIGS. 1 and 2, and is a removable medium direct access storage device (DASD) capable of receiving a diskette inserted there into and using the diskette to receive, store and deliver data as is generally known. One CD ROM drive is indicated at 30 in FIGS. 1 and 2 and is a removable medium direct access storage device capable of receiving a compact disc inserted there into and using the disc to deliver data as is generally known. One hard disk drive is indicated at 31 in FIG. 2 and is a fixed medium direct access storage device capable of storing and delivering data as is generally known.

Figure 3:
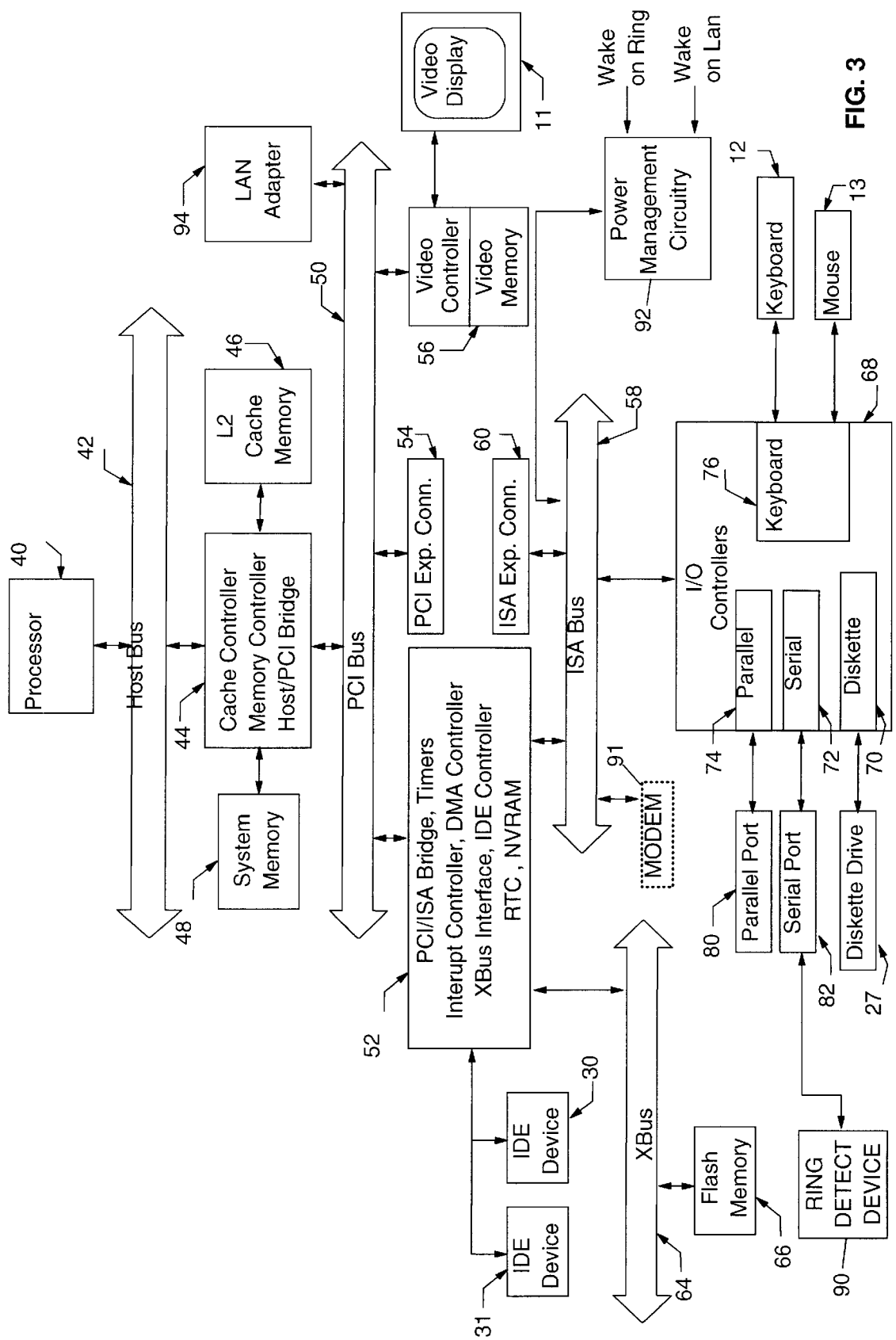
FIG. 3 shows a block diagram of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar 20 to the IO expansion connectors and other hardware of the personal computer system. Connected to the planar 20 is the system CPU or processor 40 which is connected directly to a high speed CPU host bus 42. A first system core logic chipset 44 and L2 cache memory 46 are also connected to the host bus 42. The first core logic chipset 44 includes a memory control unit, a L2 cache controller and a peripheral component interconnect (PCI) bridge. The memory control unit is further connected to a volatile random access memory (RAM) 48. The RAM memory 48 is composed of one or more memory modules. The memory controller includes the logic for mapping addresses to and from the microprocessor 40 to particular areas of RAM 48. The cache controller is operatively coupled to the L2 cache memory 46.

The first core chipset 44 can be, for example, a Triton VX chip which is sold by Intel Corporation. The PCI bridge within chipset 44 provides an interface between the local bus 42 and a PCI bus 50. Connected to the PCI bus 50 is a second core chipset 52 and a plurality of PCI expansion connectors 54 for receiving PCI bus compatible peripheral cards. One such peripheral card is a video controller 56. The video controller 56 includes video memory and is coupled to the monitor or video display terminal 11. The chipset 52 can be, for example, an PIIX3 chip which is also sold by Intel Corporation.

The chipset 52 contains a bus control and timing unit, a plurality of timers, an interrupt controller, a direct access memory (DMA) unit, nonvolatile CMOS RAM, also herein referred to as NVRAM, a CMOS real-time clock (RTC), an XBus controller, a PCI/ISA bridge and an integrated drive electronics (IDE) controller. The PCI/ISA bridge provides an interface between the PCI bus 50 and an optional feature or expansion bus such as the Industry Standard Architecture (ISA) bus 58. Connected to the ISA bus 58 are a plurality of ISA expansion connectors 60 for receiving ISA adapter cards (not shown). ISA adapter cards can be pluggably connected to the ISA expansion connectors 60 and may provide additional IO devices or memory for the system 10.

The IDE controller provides for the attachment of IDE compatible storage devices such as the fixed disk drive 31 and CD-ROM drive 30.

The real-time clock is used for time of day calculations and the NVRAM is used to store system configuration data. That is, the NVRAM will contain values which describe the present configuration of the system 10. For example, NVRAM 96 contains information describing the type of fixed disk or diskette, the list of IPL devices set by a user and the sequence to be used for a particular power on method, the type of display, the amount of memory, time, date, etc. Furthermore, these data are stored in NVRAM whenever a special configuration program, such as configuration/setup, is executed. The purpose of the configuration/setup program is to store values characterizing the configuration of the system to NVRAM.

Coupled to the ISA bus 58 is a multi-function IO controller 68 such as, for example, a National Semiconductor PC87306. The IO controller 68 contains a variety of IO adapters and other components such as the diskette adapter 70, serial adapter 72, a parallel adapter 74 and keyboard controller 76. The diskette adapter 70 provides the interface to the diskette drive 27. The serial adapter 72 has an external port connector 82 for attachment of external devices such as ring detect device 90. The parallel adapter 74 has an external port connector 80 for attachment of external devices such as printers (not shown). The keyboard controller 76 is the interface for the keyboard 12 and the mouse 13.

Power management circuitry 92 is also coupled to the ISA bus 58 for changing the system 10 between various states (e.g., off standby, suspend and normal operating states). Two states which are applicable to the present invention are the off and normal operating states and the description which follows will only be with regard to those two states. A more detailed description of each of the states and the transitions therebetween is provided in the above mentioned related patents and application which are hereby incorporated by reference.

The circuitry 92 is supplied with auxiliary power from the power supply 17 when the system 10 is in the off state so that it can monitor events which cause the system 10 to turn on. For example, when the system is in the off state and a telephone ring is detected by ring detect device 90, a wake on ring signal is sent from the device 90 through serial port 82 to the power management circuitry 92. In response to receiving this signal the circuitry 92 will cause system 10 to change to the normal operating state. The ring detect device 90 can be, for example, an external modem or any other device which can detect a telephone ring and generate the wake on ring signal to the circuitry 92. Such other devices can include motion sensors, voice activated sensors, light sensors, etc. In addition, an internal modem 91 could be connected directly to the ISA bus 58 or PCI bus 50. The modem 91 is wired to a modem pin on the planar 20 and is operative to generate the ring signal when it detects a telephone ring.

The circuitry 92 also includes a timer which is configurable by a user to expire after a predetermined period of time. When the timer expires, the circuitry 92 will cause the system 10 to change from the off state to the normal operating state.

A LAN adapter 94 can be coupled to either the PCI bus 50 or the ISA bus 58 for allowing system 10 to communicate with a remote computer 34 or server over a LAN. The LAN adapter is supplied with auxiliary power from the power supply 17 when the system 10 is off. The LAN adapter 94 scans all incoming frames from the LAN addressed to system 10 for a specific data frame. When this data frame is received, the LAN adapter 94 alerts the power management circuitry 92 via a wake on LAN signal to power on the system 10 (i.e., change from the off state to the normal operating state). The LAN adapter can be, for example, an IBM Auto Wake Token-Ring ISA Adapter.

A planar XBus 64 is coupled to the PCI bus 50 and ISA bus 58 via chipset 52. The planar XBus 64 includes address, data, and control components respectively. The planar XBus 64 is an additional IO bus in system 10 and is used as a local bus to support slow speed peripheral devices that reside on the planar board. Attached to the XBus 64 is a flash memory (FM) module or chip 66.

The flash memory 66 is an electrically erasable programmable read only memory (EEPROM) module or chip and includes the BIOS that is used to interface between the 10 devices and the operating system. BIOS stored in memory 66 can be copied into RAM 48 to decrease the execution time of BIOS. FM 66 is further responsive to the XBus controller (via ROMSEL signal) within chipset 52. If System RAM 48 is disabled for the BIOS address range then access requests to that address range are passed through the host bridge 44 and the PCI/ISA bridge to memory 66. If System RAM 48 is enabled for the BIOS address range then access requests to that address range are directed to system RAM 48.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor 40 could be an Intel Pentium processor, Cyrix 586-P75 processor or Advanced Micro Devices 8486 processor or any other suitable microprocessor.

The microcomputer system 10 is shown with 16 megabytes of system memory 48. It is understood that additional memory can be interconnected as represented in FIG. 3 by installing additional or higher-density memory modules. For purposes of illustration only, the present invention is described with reference to the 16 megabyte memory configuration.

Referring back to FIG. 1, there is shown the local computer system 10 along with a perspective view of a remote personal computer 34. While not here shown or described in detail, the remote computer system 34 has components and attributes like those illustrated and described with regard to FIG. 3 and those additional elements appropriate to provide the non-volatile storage mentioned, as is known to the person skilled in the appropriate arts. A storage means associated with the remote computer 34 can be a non-volatile means such as a direct access storage device (DASD) in the form of a hard disk device, diskette, compact disc or the like.

The local and remote computers 10, 34 are associated one with the other through some form of local area network (LAN) or the like, in which effective communication may be established through electrically conductive connections, through fiber optical links, through infrared or other radiation links, or in other manners. Such a link is indicated in FIG. 1 at 36. The network may be a token-ring network or an Ethernet network, or other known type of network. Each of the computers may be a "personal computer" as defined herein. Alternatively, the remote computer 34 may be some computer having capabilities other than those ascribed herein to a "personal computer", and possibly beyond those capabilities.

While the term "remote" is used with reference to the computer system 34 through which the LAN station local computer system 10 accesses BIOS, that term is used in the sense of indicating separation, rather than in the sense of indicating a large physical distance between the systems. In fact, such system may be physically adjacent in some network arrangements. The remote computer system 34 polls local computer systems with which it is associated (such as the local system 10 here identified) to discover requests for procurement of BIOS or setup instructions.

The present invention is directed to a computer system 10 which includes at least two different boot sequences that can be selected by a user depending on how the computer system 10 is powered on. This allows a user to choose which storage devices, and in which order, to IPL from depending on the manner in which the computer system 10 was powered on. For example, if the computer system 10 is powered on by the power switch 21, the user can set that the following devices, in the following order (sequence A), are checked for a valid boot record; (1) diskette drive, (2) hard drive and (3) network. If the system 10 is powered on remotely over a LAN, the user can set a different group of devices in a different order (sequence B) to be checked for a valid boot record; (1) network, (2) hard drive and (3) diskette drive.

Figure 4:
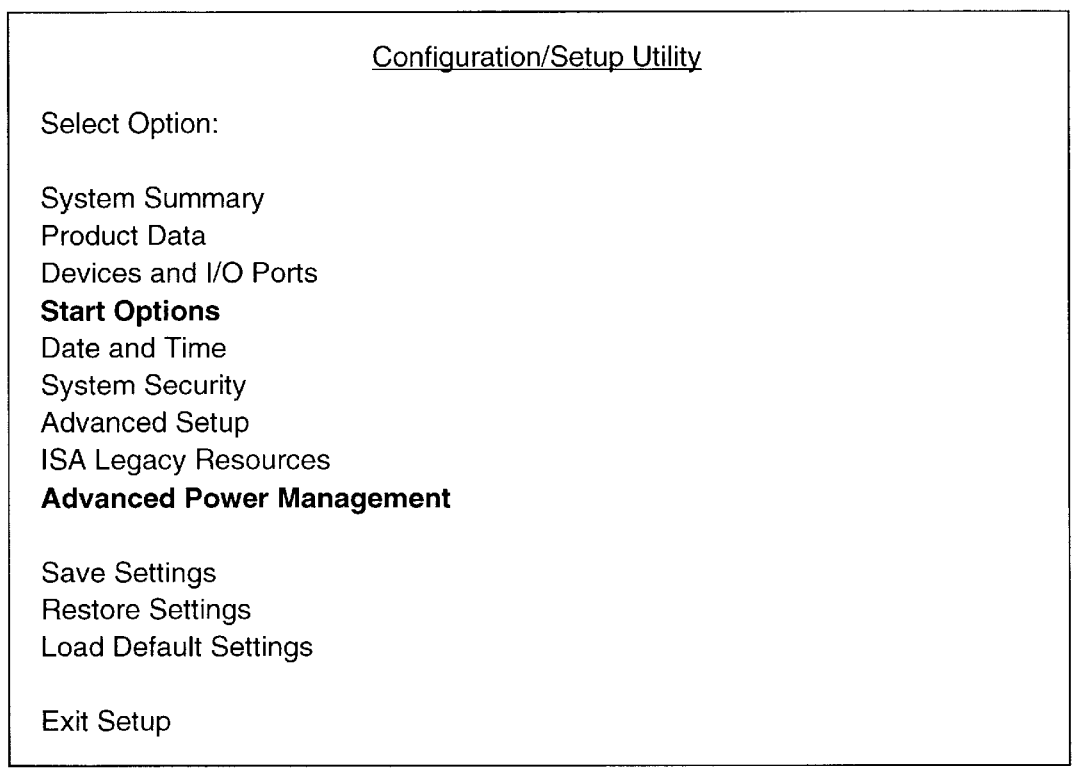
Figure 5:
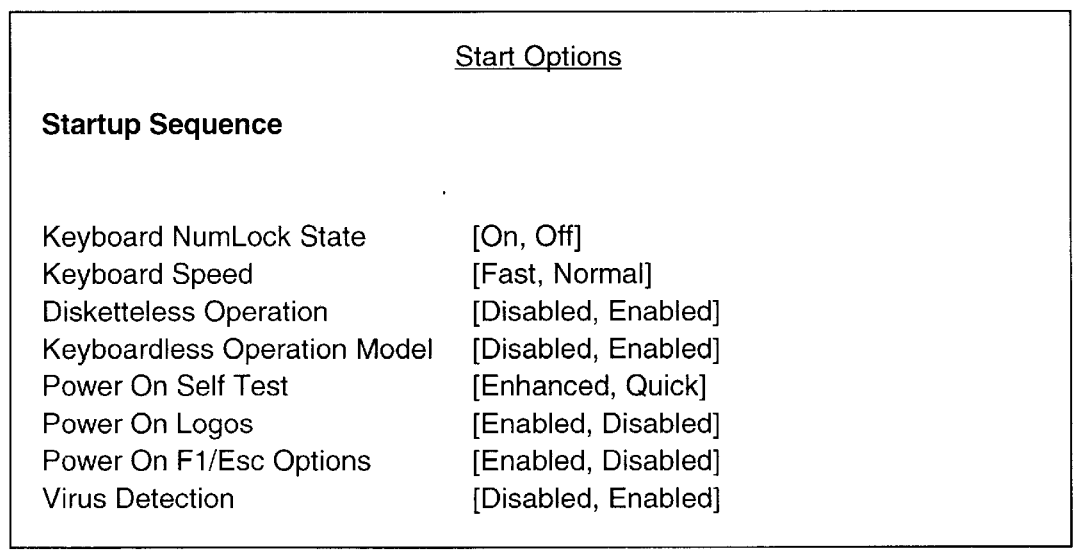

Referring now to FIGS. 4–9, there is shown the setup screens that are displayed on monitor 11 when a user accesses the configuration/setup utility program which is stored in flash memory 66. The user can access this program by, for example, depressing the F1 key during POST. The first screen that would be displayed is shown in FIG. 4 and is the main configuration/setup screen. (It should be noted that the description which follows will only be with regard to the screen items that are relevant to the present invention.) The user can next select "Start Options" which will bring up the screen shown in FIG. 5 (the selections can be done by, for example, the user moving cursor control buttons on the keyboard 12 until the desired item is highlighted and then press the "enter" button on keyboard 12). Next, the user would select "Startup Sequence" and the screen shown in FIG. 6 would be displayed on monitor 11.

As shown in FIG. 6, there is a Primary Startup Sequence (PSS) and an Automatic Power On Startup Sequence (APSS). As will be described in more detail below, the PSS can be used by POST when the system 10 is powered on by the power switch 21, or can be selected to be used when the system 10 is powered on by methods other than the power switch 21 (e.g., serial port ring detect, modem ring detect, wake on alarm or wake on LAN). The APSS can be selected to be used by POST when the system is powered on by methods other than the power switch 21.

As shown in FIG. 6, a user may select, for example, between four items as the first startup device for the Primary Startup Sequence; Diskette Drive 0, Hard Disk 0, Network, Disabled. These four items are for illustrative purposes and reflect what is installed in a typical computer system. It should be understood that the CD-ROM drive 30 could also be one of the items. In addition, if more that one diskette or hard drive were installed then the choices could include Diskette Drive 1, Hard Disk 1, Diskette Drive 2, Hard Disk 2, etc. Referring back to the four options, depending on which device is selected for the first startup device affects the choices for the second, third and fourth startup devices. Similarly, depending on which device is selected for the second startup device affects the choices for the third and fourth startup devices and so on. For example, if the diskette drive is chosen as the first startup device then the second startup device would have the three other choices (hard disk, network and disabled). It should be noted that if Disabled is chosen for any one of the startup devices then the higher numbered startup devices are automatically disabled. For example, if the second startup device is selected as Disabled then the third and fourth startup devices are automatically disabled.

Similarly, if the APSS line is "Enabled" a user may select between four items as the first startup device for the Automatic Power On Startup Sequence; Diskette Drive 0, Hard Disk 0, Network, Disabled. (If the APSS is "Disabled" then all four of the startup devices are automatically disabled since the user has chosen not to use the APSS feature.) Again, depending on which item is selected for each startup device affects the choices for the next higher startup device. For example, if the diskette drive is chosen as the first startup device then the second startup device would have the three other choices (hard disk, network and disabled), etc. Again, if Disabled is chosen for any one of the startup devices then the higher numbered startup devices are automatically disabled.

Before or after the user has selected each of the startup devices for the PSS and APSS, the user may select which of the two startup sequences to use for each type of power on method. More specifically, the user can go to the main screen shown in FIG. 4 to select "Advanced Power Management" and the screen shown in FIG. 7 would then be displayed. The user could then select "Automatic Power On" and the configuration/setup program would then display the screen shown in FIG. 8. Although this screen shows four alternative methods (in addition to the power switch 21) to power on system 10, it should be understood that any other methods that are developed could be added here and the present invention should not be limited to the four methods shown. Each of the four methods can be enabled or disabled by the user. If the particular method is enabled then the user can select either the PSS or the APSS as shown in FIG. 8. If the particular method is disabled then the startup sequence line is greyed out to indicate that the user cannot choose a particular sequence for that particular method since it is disabled.

The first method is a serial port ring detect which is used when system 10 has a wake on ring feature. If this feature is enabled and a telephone ring detect device 90 is connected to serial port 82 then when a ring is detected by the device, it generates a signal to the power management circuitry 90 will power on system 10 as is well known to one skilled in the art of the present invention. This wake on ring feature will be referred to herein as a "serial port ring detect".

The second method is a modem ring detect which is used when system 10 has a wake on ring feature and an internal modem 91 is coupled to the ISA bus 58 or the PCI bus 50. As described above, the modem 91 is wired to a modem pin on the planar 20 and is operative to generate the ring signal when it detects a telephone ring. If the modem ring detect feature is enabled and a phone line is connected to the modem 91, then when the modem 91 detects a ring, the circuitry 90 will cause system 10 to change from the off state to a normal operating state as is well known to one skilled in the art of the present invention.

The third method is wake on alarm wherein the user can select to have the system 10 powered on at a single event or a daily event based on the expiration of a timer. The timer could be within power management circuitry 90 or the systems' real time clock could be used. If daily event is chosen then the user sets an Alarm Time and each day at the set alarm time the system 10 will power on. If the user selects single event then the user sets both the Alarm Time and the Alarm Date (MM/DD/YY) and only at that date and time will the system 10 power on. Lastly, the user may select Wake On LAN which will bring up the screen shown in FIG. 9. If the user enables this feature, then the LAN adapter 94 scans all incoming frames addressed to the computer system 10 for a specific data frame or packet. When this packet is received, the LAN adapter 94 alerts the power management circuitry 90 via a wake on LAN signal to power on (or wake up) the system 10.

For a more detailed description of each of the power on methods shown in FIGS. 8 and 9 see the above mentioned related applications which are hereby incorporated by reference.

Figure 10:
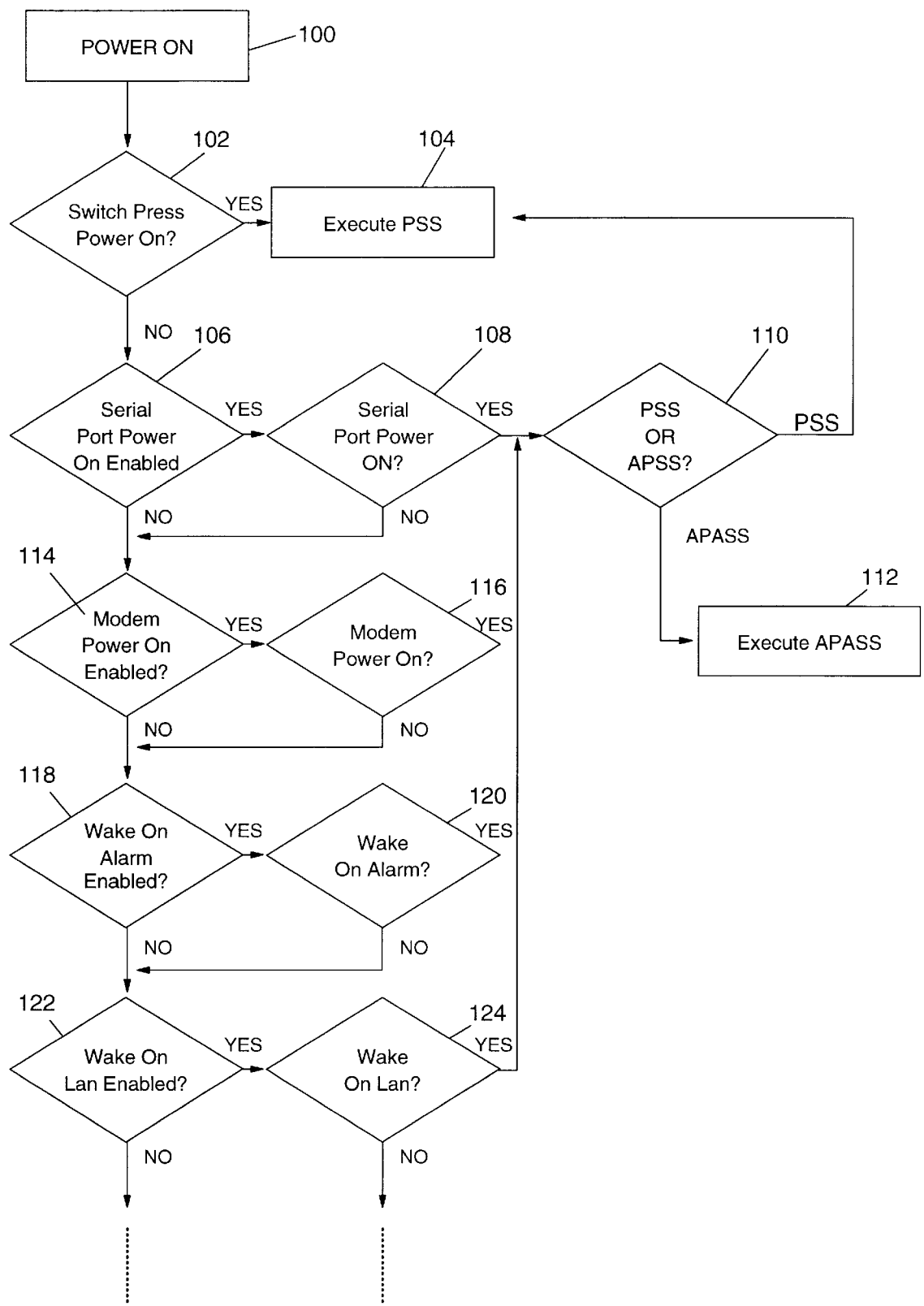
FIG. 10 is a flow diagram of a portion of a power on self test (POST) for implementing the present invention.

The operation of the present invention will now be described with reference to the flow diagrams of FIGS. 10 and 11. When the system 10 is powered on by any of the methods mentioned above, the power on self test (POST) will be executed out of flash memory 66 and operates as illustrated by the flow diagrams shown in FIG. 10 and 11. Most functions performed by POST are well known to those skilled in the art of the present invention and are not described below and have not been included in the flow diagrams of FIGS. 10 and 11. Only those functions which are relevant to the present invention are described below.

When the system 10 is powered on at 100 by any of the methods mentioned above, it executes the POST code and will reach decision block 102 where the code determines whether it was powered on by a press of power switch 21. If it was a switch press power on, then execution of POST would proceed to execute the Primary Startup Sequence at 104. (The flow of the PSS and APSS sequences will be described below with regard to FIG. 11.)

On the other hand, if the system 10 was not powered on by the power switch 21, then execution would proceed from block 102 to block 106 to determine if the serial port ring detect was enabled. If enabled, execution proceeds to decision block 108 to determine if the power on was due to a serial port ring detect. If the power on was due to a serial port ring detect, then POST proceeds to check which of the two startup sequences was chosen for this power on at 110. Based on the user selection shown in FIG. 8, POST will execute either the PSS at 104 or the APSS at 112.

If the decision at either block 106 or 108 was NO then execution would proceed to determine whether the modem ring detect power on was enabled at 114. If enabled, execution proceeds to decision block 116 to determine if the power on was due to a modem ring detect. If the power on was due to a modem ring detect, then POST will take the YES branch from block 116, go back to block 110 and proceed as described above.

If the decision at either block 114 or 116 was NO then execution would proceed to determine whether the wake on alarm power on was enabled at 118. If enabled, execution proceeds to decision block 120 to determine if the power on was due to a wake on alarm. If a wake on alarm was the source of the power on, then POST will take the YES branch from block 120, go back to block 110 and proceed as described above.

If the decision at either block 118 or 120 was NO then execution would proceed to determine whether the wake on LAN power on was enabled at 122. If enabled, execution proceeds to decision block 124 to determine if the power on was due to a wake on LAN. If a wake on LAN was the source of the power on, then POST will take the YES branch from block 124, go back to block 110 and proceed as described above.

If the decision at either block 122 or 124 was NO then execution would proceed to check any other power on methods available in the system 10 in a similar fashion to the steps described above. The program would check each power on method until it found the method that caused the power on and then execute either the PSS at 104 or APSS at 112.

Figure 11:
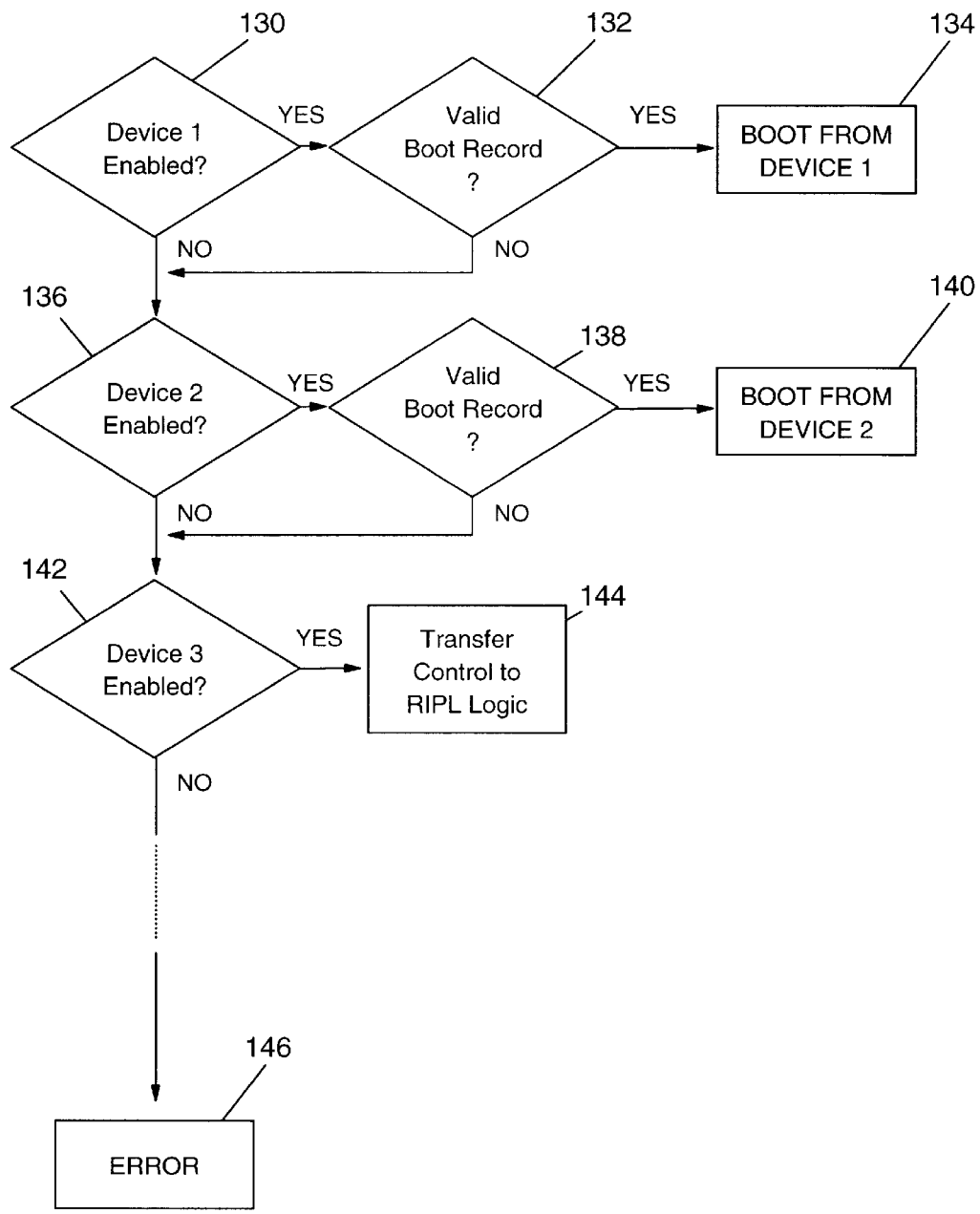
FIG. 11 is a flow diagram of primary startup sequence or an alternative startup sequence which is executed in accordance with user selections and in accordance with the present invention.

Referring now to FIG. 11, there is shown a flow diagram of the PSS which is executed at 104 and the APSS which is executed at 112 of FIG. 11. The flow diagram of FIG. 11 is generically described and applies to both the PSS and the APSS sequences. The flow diagram will be described with an example user selection of startup devices wherein the first startup device is the diskette drive 27, the second startup device is the hard drive 31 and the third startup device is the network. It should be understood that the user can select these devices in any order as described above with regard to FIG. 6.

When POST executes either the PSS at 104 or the APSS at 112, decision block 130 is entered and the code checks whether the first startup device (diskette drive 27) is enabled. If the diskette drive 27 is enabled, POST proceeds to check whether a diskette with a valid boot record is present in the diskette drive 27 at 132. If it is, control is transferred to the diskette boot record at 134.

If the decision at either block 130 or 132 was NO then execution would proceed to determine if the second startup device (hard drive 31) is enabled at 136. If the hard disk is enabled, POST checks whether a valid fixed disk boot record is present at 138. If it is, control is transferred to the fixed disk boot record at 140.

If the decision at either block 136 or 138 was NO then execution would proceed to determine if the network adapter 94 (third startup device) having RIPL capability is installed at 142. If the adapter 94 is installed, POST transfers control to a start address of RIPL logic in the LAN adapter 94 ROM at 144. Once control has been transferred to the RIPL ROM logic, the RIPL ROM logic establishes the connection with a remote network computer 34, and enables the remote IPL of the operating system in a conventional manner.

If the decision at block 142 was NO then execution would proceed to the fourth startup device, and up to however many startup devices there are selected by the user. If no valid boot record is found after checking for each of the startup devices then an error would be declared at 146 and an error message will be displayed on the monitor 11 to indicate to the user that no valid bootable storage device was found.

One advantage of the present invention is that it allows for easier network management of computer systems. For example, the computer system can be set up to IPL from a diskette or fixed disk when a user starts the system via the power switch 21. The system can be further set up to RIPL to a remote computer 34 or server machine when the system is turned on via a wake up packet over a LAN. This would allow a network administrator to update software or run remote diagnostics when the user is not present.

While the invention has been particularly shown and described with respect to preferred embodiments thereof, it should be understood by those skilled in the art that the foregoing and other changes in form and detail may be made therein without departing from the spirit and scope of the invention as defined in the appended claims. For example, the number of IPL devices described above, is exemplary only and any number can be used which is at least two. In addition, the order in which power on methods were checked in FIG. 10 is for illustrative purposes only and any order can be used. It should further be understood by one skilled in the art of the present invention that many other combinations of devices can be used in any order. In addition, the CD-ROM 30 (or a digital versatile disc (DVD) ROM if included in system 10) can be selected by the user to be the first startup device, second startup device, third startup device, etc. to IPL from.

What is claimed is:

1. A computer system which can be powered on by at least a first and a second method, said first method being different from said second method, and being operative for allowing a user to select which one of at least two different pre-selected ordered list of initial program load (IPL) devices are to be used depending on whether the system was powered on by the first method or the second method, said computer system comprising:
   a processor coupled to a local bus and an input/output (IO) bus,
   a direct access storage device (DASD) being electrically coupled to the processor and being capable of storing a plurality of data records,
   a non-volatile memory coupled to said CPU and said IO bus, said non-volatile memory having basic input output system (BIOS) stored therein, said BIOS being effective for responding to the energization of the computer system by initiating a power on self test (POST),
   said non-volatile memory also storing a first pre-selected ordered list of IPL devices and a second pre-selected ordered list of IPL devices,
   wherein said POST is operative to determine whether said system was powered on by said first power on method or said second power on method and if said first power on method was used, said POST will attempt to IPL from said first pre-selected ordered list of IPL devices and if said second power on method was used, said POST will attempt to IPL from said second pre-selected ordered list of IPL devices.

2. The computer system of claim 1, wherein said system further comprises:
   power circuitry in circuit communication with said CPU for selectively changing the state of said computer system between an off state and a normal operating state in response to at least one of a plurality of preselected events,
   a ring detect device in circuit communication with said power circuitry,
   a timer in circuit communication with said power circuitry and configurable by a user to expire after a predetermined period of time,
   a switch, in circuit communication with said power circuitry,
   wherein said power circuitry is further characterized by causing said computer system to change from said off state to said normal operating state responsive to a closure event of said switch, a ring detected via said ring detect device, or the expiration of said timer, and
   wherein said first power on method is said closure event of said switch and said second power on method is selected from the group consisting of said ring detected via said ring detect device and said expiration of said timer.

3. The computer system of claim 2, wherein said ring detect device is a modem.

4. The computer system of claim 2, wherein:
   said first pre-selected ordered list of IPL devices is (1) a diskette within a diskette drive electrically coupled to said processor and (2) a fixed disk electrically coupled to said processor, and
   said second pre-selected ordered list of IPL devices is (1) said fixed disk and (2) said diskette.

5. The computer system of claim 1, wherein said system further comprises:
   power circuitry in circuit communication with said CPU for selectively changing the state of said computer system between an off state and a normal operating state in response to at least one of a plurality of preselected events,
   a switch, in circuit communication with said power circuitry,
   a network adapter having the capability of enabling initial program load from a location remote from said computer system and in circuit communication with said CPU,
   wherein said power circuitry is further characterized by causing said computer system to change from said off state to said normal operating state responsive to a closure event of said switch or a wake up signal detected via said network adapter, and
   wherein said first power on method is said closure event of said switch and said second power on method is said wake up signal detected via said network adapter.

6. The computer system of claim 5, wherein:
   said first pre-selected ordered list of IPL devices is (1) a diskette within a diskette drive electrically coupled to said processor, (2) a fixed disk electrically coupled to said processor, and (3) said remote initial program load via said network adapter, and
   said second pre-selected ordered list of IPL devices is (1) said remote initial program load, (2) said diskette and (3) said fixed disk.

7. The computer system of claim 1, wherein said system is further operative to be powered on by a third power on method, and wherein said POST is operative to determine whether said system was powered on by said first, second or third power on methods and if said third power on method was used, said POST will attempt to IPL from said first pre-selected ordered list of IPL devices.

8. The computer system of claim 7, wherein said system further comprises:

power circuitry in circuit communication with said CPU for selectively changing the state of said computer system between an off state and a normal operating state in response to at least one of a plurality of preselected events, a ring detect device in circuit communication with said power circuitry, a switch, in circuit communication with said power circuitry, a network adapter having the capability of enabling initial program load from a location remote from said computer system and operatively interconnected with said CPU, wherein said power circuitry is further characterized by causing said computer system to change from said off state to said normal operating state responsive to a closure event of said switch, a ring detected via said ring detect device, or said wake up signal detected via said network adapter, and wherein said first power on method is said closure event of said switch, said second power on method is said ring detected via said ring detect device and said third power on method is said wake up signal detected via said network adapter.

9. The computer system of claim 8, wherein:

said first pre-selected ordered list of IPL devices is (1) a diskette within a diskette drive electrically coupled to said processor, (2) a fixed disk electrically coupled to said processor, and (3) said remote initial program load via said network adapter, and said second pre-selected ordered list of IPL devices is (1) said remote initial program load, (2) said diskette and (3) said fixed disk.

10. The computer system of claim 1, wherein said system is further operative to be powered on by a third power on method, and wherein said POST is operative to determine whether said system was powered on by said first, second or third power on method and if said third power on method was used, said POST will attempt to IPL from said second pre-selected ordered list of IPL devices.

11. The computer system of claim 10, wherein said system further comprises:

power circuitry in circuit communication with said CPU for selectively changing the state of said computer system between an off state and a normal operating state in response to at least one of a plurality of preselected events, a ring detect device in circuit communication with said power circuitry, a switch, in circuit communication with said power circuitry, a network adapter having the capability of enabling initial program load from a location remote from said computer system and in circuit communication with said CPU, wherein said power circuitry is further characterized by causing said computer system to change from said off state to said normal operating state responsive to a closure event of said switch, a ring detected via said ring detect device, or said wake up signal detected via said network adapter, and wherein said first power on method is said closure event of said switch, said second power on method is said ring detected via said ring detect device and said third power on method is said wake up signal detected via said network adapter.

12. The computer system of claim 11, wherein:

said first pre-selected ordered list of IPL devices is (1) a diskette within a diskette drive electrically coupled to said processor, (2) a fixed disk electrically coupled to said processor, and (3) said remote initial program load via said network adapter, and said second pre-selected ordered list of IPL devices is (1) said remote initial program load, (2) said diskette and (3) said fixed disk.

* * * * *